United States Patent [19]

Ruckdeschel, Jr.

[11] E Re. 30,631

[45] Reissued Jun. 2, 1981

[54] SADDLE LOCK-UP FOR TAB-LESS FLEXIBLE PRINTING PLATES

[75] Inventor: Charles B. Ruckdeschel, Jr., Wilmington, Del.

[73] Assignee: Hercules Incorporated, Wilmington, Del.

[21] Appl. No.: 709,053

[22] Filed: Jul. 27, 1976

Related U.S. Patent Documents

Reissue of:

[64] Patent No.: 3,896,727
Issued: Jul. 29, 1975
Appl. No.: 446,454
Filed: Feb. 27, 1974

[51] Int. Cl.[3] ..... B41F 27/00; B41F 27/06

[52] U.S. Cl. ..... 101/415.1; 101/383

[58] Field of Search ..... 101/415.1, 383; 51/358, 51/368, 370, 380, 392, 384, 386

[56] References Cited

U.S. PATENT DOCUMENTS

| | | | |
|---|---|---|---|
| 453,862 | 6/1891 | Hawkins | 101/415.1 |
| 1,260,470 | 3/1918 | Smith et al. | 101/415.1 |
| 2,688,827 | 9/1954 | Hobday | 51/384 |
| 2,730,948 | 1/1956 | Mitchell | 101/415.1 |
| 3,416,447 | 12/1968 | Pozniak | 101/415.1 |
| 3,696,744 | 10/1972 | Etchell | 101/415.1 |
| 3,791,295 | 2/1974 | Albright | 101/415.1 |

*Primary Examiner*—Louis G. Mancene
*Assistant Examiner*—Paul J. Hirsch
*Attorney, Agent, or Firm*—Marion C. Staves; James W. Peterson

[57] ABSTRACT

The invention is a saddle lock-up for flexible printing plates utilizing a plurality of radially and axially moveable sleeves contained within an inverted wedge-shaped opening.

4 Claims, 6 Drawing Figures

SADDLE LOCK-UP FOR TAB-LESS FLEXIBLE PRINTING PLATES

Matter enclosed in heavy brackets [ ] appears in the original patent but forms no part of this reissue specification; matter printed in italics indicates the additions made by reissue.

BACKGROUND OF THE INVENTION

Until the past few years, printing had been accomplished by the utilization of semicylindrical lead stereos attached to the surface of rotary press cylinders. Modern technology has made possible the utilization of photopolymers to produce thin flexible printing plates. It is extremely desirable to directly replace the cumbersome heavy lead stereos with light-weight saddles that will positively grip and tension flexible polymer printing plates. The problem of attaching flexible members to printing cylinders has traditionally been solved by utilization of complex mechanisms contained within the rotating cylinder. For economic reasons it is preferable to provide a saddle that can be mounted on a conventional cylinder and that will accomplish the same result. The problem has been to positively grip a flexible printing plate within the narrow dimensional confines of saddle thickness. Such a design criteria eliminates the possibility of utilizing bulky mechanical components to produce the clamping forces required. Photopolymer printing plates are generally made by bonding the photopolymer resin to some form of substrate. It is most desirable to positively grip the substrate directly to avoid the problem of photopolymer-substrate separation during press operation. To accomplish this, several manufactures have bonded the photopolymer resin directly to a thin metal backing in order that more conventional clamping of the stronger metal backing could be employed. The instant invention, however, provides positive gripping means within the narrow confines of saddle thickness that will positively grip a flexible substrate. As mentioned before, the prior art has dealt with the problem of attaching a flexible member to a rotating cylinder, as illustrated by U.S. Pat. No. 1,168,498, by utilization of complex mechanical devices within the cylinder. Saddle thickness essentially identical to lead stereo thickness does not allow the luxury of such bulky mechanisms to effect positive clamping. The patent illustrates the use of a roll 8 in combination with a wedge-shape opening 5 to effect clamping. The patent does not show the instant invention which utilizes a plurality of radially and axially moveable sleeves within a wedge-shaped opening, said sleeves individually conforming to the flexible plate yet allowing transverse adjustment of the plate for purposes of color registration.

OBJECTS OF THE INVENTION

It is the primary object of the instant invention to provide a saddle lock-up for flexible printing plates capable of positively locking the flexible printing plate substrate.

Another object of the instant invention is to provide a saddle lock-up that may be manipulated completely by hand without the use of any tools.

It is yet another object of the instant invention to provide a saddle lock-up that will compensate for machining irregularities in sleeve diameter and straightness and wedge-shaped opening width and straightness.

And still another object of the instant invention is to provide a saddle lock-up that will allow lateral movement of the plate for purposes of color registration.

SUMMARY OF THE INVENTION

The purpose of the instant invention is to provide a saddle lock-up that will positively clamp a flexible printing plate without the use of tools within the narrow confines of saddle thickness and yet will allow lateral movement of the flexible printing plate for purposes of color registration. To accomplish this purpose the instant invention provides a plurality of radially and axially moveable sleeve members contained within a wedge-shaped transverse opening, said printing plate being clamped between said sleeves and a side of said opening.

DESCRIPTION OF THE PREFERRED EMBODIMENT

Figure 1:
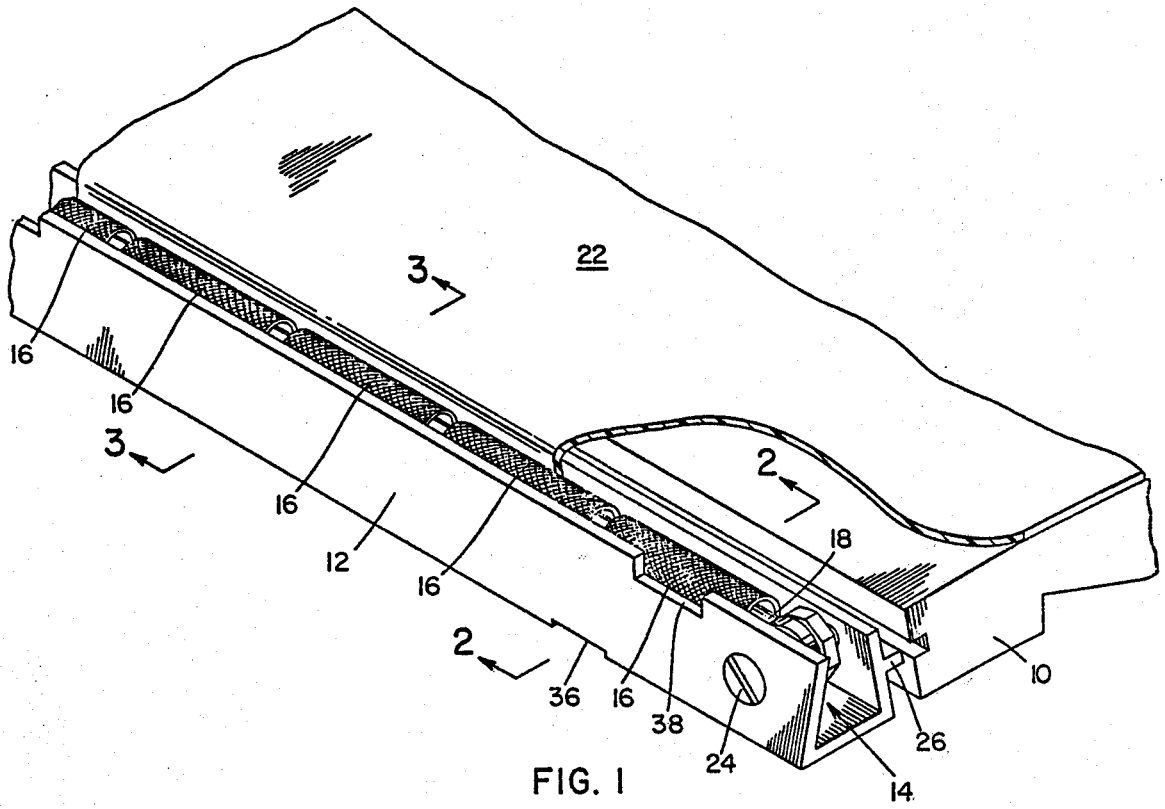
FIG. 1 is a partial perspective view of the trailing edge of the printing saddle of the instant invention.
Figure 2:
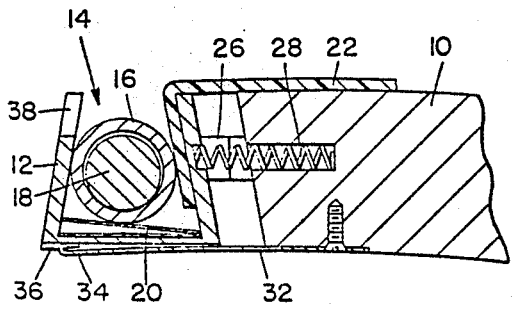
FIG. 2 is a partial section view taken along the section lines 2—2 in FIG. 1.
Figure 3:
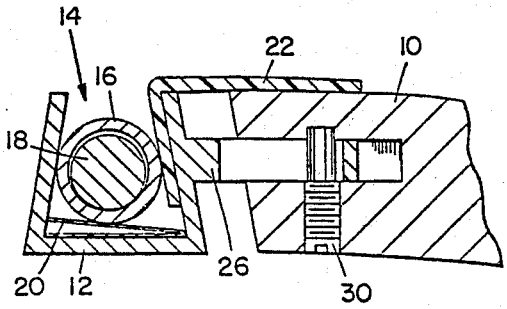
FIG. 3 is a partial section view taken along section lines 3—3 in FIG. 1.

With continued reference to the drawing, FIG. 1 shows the trailing edge of the saddle incorporating the instant invention comprising saddle body 10 and channel member 12 which is moveably mounted with respect to saddle body 10. Channel member 12 contains an inverted wedge-shaped opening shown generally at 14. A plurality of sleeve members 16 are contained within wedge-shaped opening 14. A rod 18 is concentrically mounted within sleeves 16, said rod 18 having a diameter less than the inside diameter of said sleeves 16 to allow radial movement of the sleeves 16. The loose fitting rod 18 provides means to simultaneously depress the sleeves deeper into opening 14. Sleeves 16 are also axially spaced from each other to allow a lateral movement within wedge-shaped opening 14. Sleeves 16 are biased toward the narrow end of wedge-shaped opening 14 by resilient means 20. Resilient means 20 is shown to be a folded mylar strip that runs the length of the assembled sleeves. The surfaces of sleeves 16 and the inside edge of channel member 12 are provided with locking faces coated, formed, machined or treated to provide friction surfaces to further aid in printing plate locking. Thus, it can be seen that the flexible printing plate is trapped and positively clamped by sleeves 16 and channel 12. Rod 18 and sleeves 16 are contained within the opening 14 by an end stop 24 shown typically as a nut and bolt arrangement. It is within the scope of the invention to use other types of stops such as machined blocks. Channel 12 is reinforced on the saddle body side by a flange 26 and saddle body 10 has been slotted to accommodate flange 26. It can be seen that channel 12 is moveable with respect to saddle body 10 to tension flexible printing plate 22 when positively gripped as discussed above. Channel 12 is resiliently biased by means 28 as shown in FIG. 2. Flange 26 is contained within saddle body 10 by a set screw 30, or the like, as shown in FIG. 3. A spring steel clip 32 is attached to saddle body 10 in a cantilever fashion at one end thereof, said clip having an upturned portion 34 at the other end thereof positioned within slot 36 to hook the front side of channel 12 when channel 12 is pushed toward saddle body 10. A finger slot 38 has been provided in channel 12, as can be seen in FIG. 2, for depressing one of the sleeves 16. A similar finger slot has provided at the other end of channel (not shown). It can be seen in FIG. 2 that when a sleeve 16 in front of finger slot 38 is depressed the inside surface of sleeves 16 will contact rod 18 which will in turn engage the inside of other sleeves 16 to force all sleeves 16 deeper within opening 14 and allow disengagement or engagement of a flexible printing plate 22. Thus, it can be seen that by hand manipulation channel 12 can be pushed toward saddle body 10 to be retained by clip 32 and that sleeves 16 may be depressed by hand through finger slot 38 for insertion of flexible printing plate 22. Resilient strip 20 will urge sleeves 16 upward into the wedge-shaped opening 14 to positively trap flexible printing plate 22. Clips 32 may then be released and channel 12 will be biased away by resilient means 26 from saddle body 10 causing sleeves 16 to firmly seat in opening 14 and allowing channel 12 to tension flexible printing plate 22.

Figure 4:
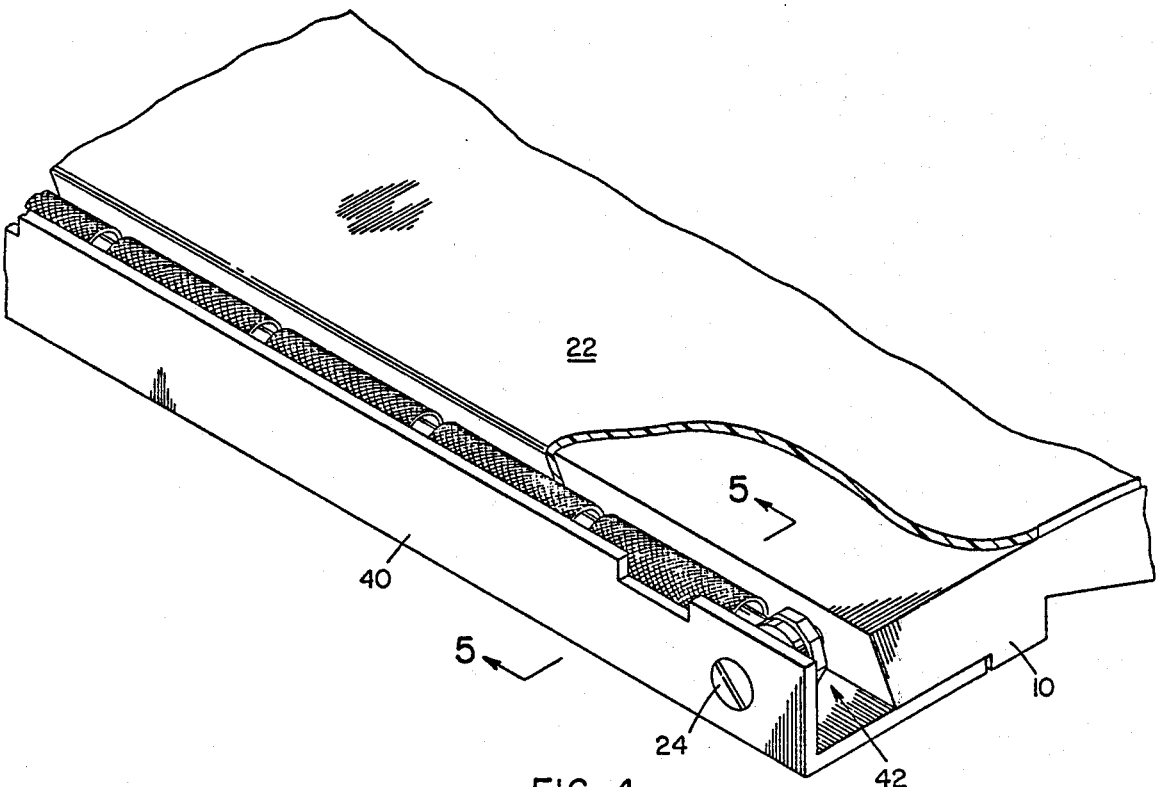
FIG. 4 is a partial perspective view of the leading edge 15 of the saddle of the instant invention.
Figure 5:
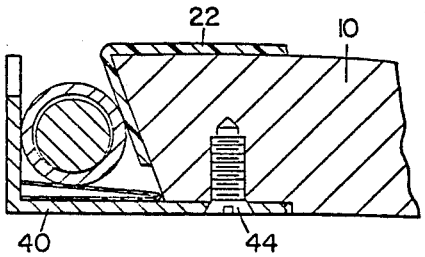
FIG. 5 is a partial section view taken along section lines 5—5 in FIG. 4.

The leading edge of the saddle as shown in FIG. 4 incorporates an essentially identical lock-up mechanism with the exception that saddle body 10 and a L-shaped plate 40 cooperate to form the wedge-shaped opening 42. L-shaped member 40 is rigidly attached to the underside of saddle body 10 by means 44.

Figure 6:
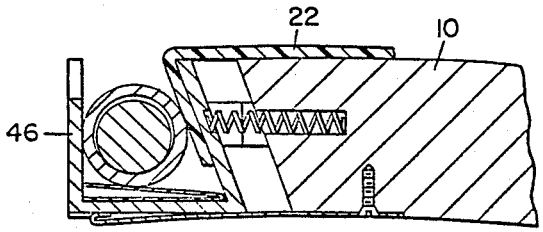
FIG. 6 is a partial section view similar to FIG. 2 of an alternate embodiment of the instant invention.

An alternate embodiment of the instant invention is shown in FIG. 6, wherein a channel member 46 having one vertical and one inclined side is utilized rather than two inclined sides. It can be seen that a channel 46 is provided which is less costly to machine but yet still provides positive plate gripping action by the interaction of plurality of independent loose-fitting sleeves 16 and a wedge-shaped opening.

It is understood that the invention is not limited to the precise construction shown, but that changes are contemplated that readily fall within the spirit of the invention as shall be determined by the scope of the appended claims.

What I claim and desire to secure by Letters Patent is:

1. A saddle lock-up for flexible printing plates comprising:

a semi-cylindrical saddle body having a leading edge and a trailing edge;

leading edge clamping means connected to the leading edge of said saddle to positively grip one end of a flexible printing plate;

a transverse channel member moveably connected to the trailing edge of said saddle body to move toward and away from said saddle body, said channel member having an upwardly facing inverted wedge-shaped opening therein;

resilient means biasing said channel member away from said trailing edge; and means mounted within said channel to positively grip a flexible printing plate and to allow lateral adjustment of a printing plate, said means comprising a plurality of transversely spaced sleeves within said channel member, said sleeves radially and axially independently mounted with respect to each other and defining a gap between said sleeves and one side of the inside of said channel member to positively grip the other end of the flexible printing plate in said gap, said sleeves conforming to the thickness of a flexible printing plate independent of each other and allowing lateral movement of the flexible printing plate for purposes of color registration.

2. A saddle lock-up for flexible printing plates comprising:

a semi-cylindrical saddle body having a leading edge and a trailing edge;

leading edge clamping means connected to the leading edge of said saddle to positively grip one end of a flexible printing plate;

a tranverse channel member moveably connected to the trailing edge of said saddle body to move toward and away from said saddle body, said channel member having an upwardly facing inverted wedge-shaped opening therein;

resilient means biasing said channel member away from said trialing edge;

means mounted within said channel to positively grip a flexible printing plate and to allow lateral adjustment of a printing plate, said means comprising a plurality of transversely spaced sleeves within said channel member, said sleeves radially and axially independently mounted with respect to each other and defining a gap between said sleeves and one side of the inside of said channel member to positively grip the other end of the flexible printing plate in said gap, said sleeves conforming to the thickness of a flexible printing plate independent of each other and allowing lateral movement of the flexible printing plate for purposes of color registration; and means connected to said sleeves to simultaneously depress all of the sleeves deeper into the opening when inserting or removing a printing plate, said means comprising a rod concentrically mounted within said sleeves, the diameter of said rod being less than the inside diameter of said sleeves to allow independent radial movement of said sleeves, said rod contacting the inside of said sleeves when one of said sleeves is depressed within said channel member to simultaneously depress all of the sleeves deeper into the opening.

*3. A lock-up for flexible printing plates for mounting on a printing cylinder comprising:*

*leading edge clamping means to positively grip one end of a flexible printing plate, said leading edge clamping means adapted to mount on the surface of a printing cylinder;*

*trailing edge clamping means to positively grip and tension the other end of a flexible printing plate, said trailing edge clamping means being adapted to be mounted on the surface of a printing cylinder, said trailing edge clamping means having a transverse channel member being moveably mounted with respect to the surface of a printing cylinder, said channel member having an upwardly facing inverted wedge shaped opening therein;*

*resilient means contacting said channel member and biasing said channel member to tension a flexible printing plate; and*

*means mounted within said opening to positively grip a flexible printing plate and to allow lateral adjustment of the printing plate, said means comprising a plural-*

*ity of transversely spaced sleeves within said opening, said sleeves radially and axially independently mounted with respect to each other and defining a gap between said sleeves on one side of the inside of said channel member to positively grip the other end of a flexible printing plate in said gap, said sleeves conforming to the thickness of a flexible printing plate independent of each other and allowing lateral movement of the flexible printing plate for purposes of color registration.*

*4. A lock-up for flexible printing plates for mounting on a printing cylinder comprising:*

*leading edge clamping means to positively grip one end of a flexible printing plate, said leading edge clamping means adapted to mount on the surface of a printing cylinder;*

*trailing edge clamping means to positively grip and tension the other end of a flexible printing plate, said trailing edge clamping means being adapted to be mounted on the surface of a printing cylinder, said trailing edge clamping means having a transverse channel member being moveably mounted with respect to the surface of a printing cylinder, said channel member having an upwardly facing inverted wedge shaped opening therein;*

*resilient means contacting said channel member and biasing said channel member to tension a flexible printing plate;*

*means mounted within said opening to positively grip a flexible printing plate and to allow lateral adjustment of the printing plate, said means comprising a plurality of transversely spaced sleeves within said opening, said sleeves radially and axially independently mounted with respect to each other and defining a gap between said sleeves on one side of the inside of said channel member to positively grip the other end of a flexible printing plate in said gap, said sleeves conforming to the thickness of a flexible printing plate independent of each other and allowing lateral movement of the flexible printing plate for purposes of color registration; and* means connected to said sleeves to simultaneously depress all of the sleeves deeper into the opening when inserting or removing a printing plate, said means comprising a rod concentrically mounted within said sleeves, the diameter of said rod being less than the inside diameter of said sleeves to allow independent radial movement of said sleeves, said rod contacting the inside of said sleeves when one of said sleeves is depressed within said channel member to simultaneously depress all of the sleeves deeper into the opening.

* * * * *